L. E. Ransom,
Pug Mill.
No. 89,685.
Patented May 4, 1869.
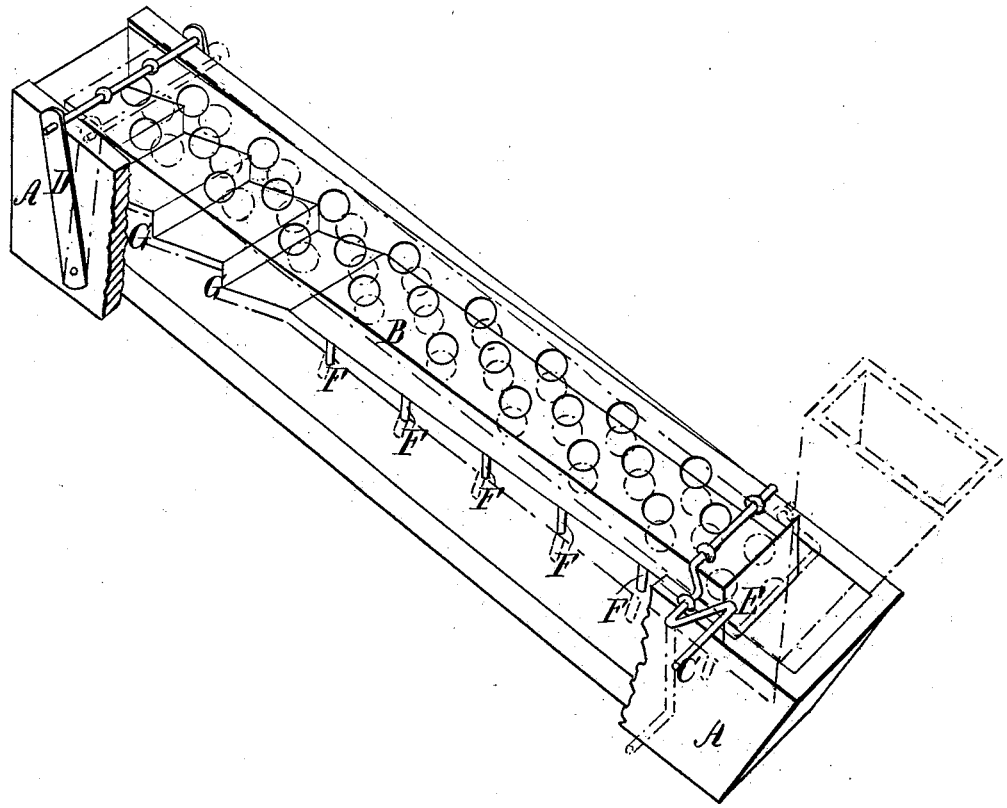
Witnesses
H. F. Eberts
L. C. Hyde
Inventor
L. E. Ransom
per Atty
Thos. S. Sprague

United States Patent Office.

LOOMIS E. RANSOM, OF TRENTON, MICHIGAN.

Letters Patent No. 89,685, dated May 4, 1869.

IMPROVED APPARATUS FOR TEMPERING CLAY.

The Schedule referred to in these Letters Patent and making part of the same.

*To whom it may concern:*

Be it known that I, LOOMIS E. RANSOM, of Trenton, in the county of Wayne, and State of Michigan, have invented a new and useful Improvement in Elevating, Conveying, and Tempering Clay; and I do declare that the following is a true and accurate description thereof, reference being had to the accompanying drawings, and to the letters of reference marked thereon, and being a part of this specification.

The drawings are in perspective, with one side removed, to show the internal construction.

The nature of this invention relates to an improved apparatus for elevating clay from what is usually termed "soak-pits," in brick and tile-yards, and for tempering said clay while being elevated or conveyed to the top of the pit.

It consists of a rectangular box, open at the top and upper end, while the lower end is closed.

A slatted or grated top should be made, to the lower end of which should be attached a crank, properly journalled to the sides of the box.

The slatted or grated top should be so attached to the crank, that in the revolutions of the latter, the former has a reciprocating, and partially rotary motion, and should be provided with teeth, hoes, cutters, and mashers, securely attached to the under side of said slatted or grated top, and operating longitudinally within said box.

A, in the drawings, represents a rectangular box without top, only having three sides, the lower end being closed, while the upper is left open.

B is the slatted or grated top, somewhat shorter than the box A, secured, near the lower end, to the crank C, which is suitably journalled to the sides of the box A.

Near its upper end the top is fulcrumed to the ears D, which are pivoted, at their lower ends, to the sides of the box, in such a manner as to allow a forward and backward movement to the top.

E is a hoe or cutter, attached to the lower end of the top, and is designed to cut off a suitable amount of clay from the mass in the hopper, (which is shown in red lines,) in the forward and downward motion of that end of the top, and carry said clay toward the other end of the box, a distance equal to the stroke of the crank.

F are spurs, arms, or cutters, secured to the under side of said top, and in the next revolution of the crank, engage with and macerate the clay delivered to them by the hoe E.

G are triangular ribs, also securely attached to the under side of said top, their base being presented to the upper end of said top, and are designed to more effectually macerate the clay, and force the same out of the upper end of the box.

A channel may be left in the bottom of the box, to receive stones, or other foreign substances which may exist in the clay being operated upon.

By unshipping the fulcrum from its engagement with the ears, the upper end of the top may be raised, turning upon the crank, thereby giving free access to the interior of the box, for the purpose of cleaning the same out when necessary.

The top is slatted or perforated, in order that the tempering-process may be watched, and dry clay or water added, through the top, as may be found necessary.

The box and its attachments may be made of any desired length, and it will elevate and puddle the clay to any height or temper that may be required.

Suitable moulds, for brick or tile, may be placed at the upper end of the box, and the clay be forced, by this apparatus, directly into the moulds, if desired.

Where the "soak-pits" are not required, the box may be laid down horizontally, and the clay thrown into the lower end, and the apparatus used as a carrier instead of an elevator. In this case the fulcrum and ears may be dispensed with, and another crank, similar to the one described, may be substituted, and the two cranks connected together by a proper rod, when the apparatus will be found to act effectually as a carrier.

By substituting flanges or hoe-blades for the spurs or arms, and constructed as last described, it will be found that a very efficient carrier for grain or flour has been produced.

What I claim as my invention, and desire to secure by Letters Patent, is—

The perforated top B, provided with hoes or cutters E, spurs F, and ribs G, when combined with the box A, and operated substantially as described, for the purpose set forth.

LOOMIS E. RANSOM.

Witnesses:
H. F. EBERTS,
L. C. HYDE.